United States Patent
Whitehead

[11] Patent Number: 5,641,940
[45] Date of Patent: Jun. 24, 1997

[54] POKE-THROUGH ELECTRICAL CONNECTION ASSEMBLY RETAINER

[75] Inventor: James H. Whitehead, Collierville, Tenn.

[73] Assignee: Thomas & Betts Corporation, Memphis, Tenn.

[21] Appl. No.: 606,387

[22] Filed: Feb. 23, 1996

[51] Int. Cl.$^6$ .................................................. H02G 3/04
[52] U.S. Cl. .......................... 174/48; 439/538; 52/220.8; 285/162; 138/112
[58] Field of Search ................. 174/48, 47; 220/3.3, 220/3.4, 3.5, 3.6; 439/538; 52/220.8; 248/679, 906; 285/162, 194, 216; 138/112, 113

[56] References Cited

U.S. PATENT DOCUMENTS

| | | | |
|---|---|---|---|
| 3,614,144 | 10/1971 | Hodges | 220/3.6 X |
| 4,243,835 | 1/1981 | Ehrenfels | 174/48 |
| 4,264,779 | 4/1981 | Rhodes et al. | 174/48 |
| 4,285,396 | 8/1981 | Schwoever et al. | 138/113 X |
| 4,323,724 | 4/1982 | Shine | 174/48 |
| 4,331,832 | 5/1982 | Curtis et al. | 174/57 |
| 4,477,694 | 10/1984 | Kohaut | 174/48 |
| 4,496,790 | 1/1985 | Spencer | 174/48 |
| 4,573,297 | 3/1986 | Benscoter et al. | 174/48 X |
| 4,770,643 | 9/1988 | Castellani et al. | 174/48 X |
| 4,783,577 | 11/1988 | Mohr | 174/48 |
| 4,827,080 | 5/1989 | Castellani et al. | 174/48 |
| 4,896,701 | 1/1990 | Young | 138/113 X |
| 4,932,179 | 6/1990 | Sosinski | 52/232 |
| 5,003,127 | 3/1991 | Sosinski et al. | 174/48 |
| 5,107,072 | 4/1992 | Morgan | 174/48 |
| 5,393,930 | 2/1995 | Wuertz | 174/48 |
| 5,410,103 | 4/1995 | Wuertz | 174/48 |

*Primary Examiner*—Hyung S. Sough
*Assistant Examiner*—Dean A. Reichard
*Attorney, Agent, or Firm*—Michael L. Hoelter; Salvatore J. Abbruzzese

[57] ABSTRACT

A poke-through electrical connector includes an elongate, generally tubular housing member and at least one retaining clip for securing the connector in an interfloor passage. The retaining clip includes a transverse flexure portion and at least one anchor point dimensioned and angled from the flexure portion for substantially radially-directed engagement with the wall of the interfloor passage. Displacement of the anchor point results in a compressive load which causes a bending moment to develop in the transverse flexure portion. The flexure results in application of a reactive retaining force by the anchor point.

10 Claims, 7 Drawing Sheets

POKE-THROUGH ELECTRICAL CONNECTION ASSEMBLY RETAINER

FIELD OF THE INVENTION

The present invention relates generally to electrical connections. More particularly the present invention relates to a poke-through electrical connection assembly with an improved retainer.

BACKGROUND OF THE INVENTION

Much activity has been devoted to avoiding the necessity of using on-floor conduits for conveying electrical power and communications lines to floor locations which were not within the original architectural and electrical planning of a facility, such as a multi-floor concrete building. Such on-floor conduits are unsightly and may pose a safety hazard, e.g., personnel may trip over the conduits and be injured.

One technique for avoiding the use of on-floor conduits involves the drilling of a passage through the concrete floor at a desired location and the routing of power or communications lines beneath the floor and then up through the passage. Transition apparatus known as "poke-throughs" have been developed for use in such passages. Such poke-throughs are subject to electrical and fire safety considerations. Among these are two fire-related requirements. First, the poke-through should not function as a chimney or fire-advancing flue in the event of a fire on the lower floor. Second, the poke-through should not function as a floor-to-floor heat conduction path.

These safety requirements have largely been met through the use of intumescent material. For example, co-assigned U.S. Pat. Nos. 5,003,127 and 5,107,072 disclose a poke-through assembly wherein a sheet of intumescent material is wired in place about a housing, and expands to fill and block the interfloor passage in the event of fire. Furthermore, thermally insulating materials have been interposed between metallic (and therefore heat conductive) portions of the poke-through devices. Thus, poke-through devices have come into common use.

With greater use of poke-through devices, there is, of course, interest in making their manufacturing economical, their installation easier and faster, and their retention more positive. One prior-art method requires the installer to turn two screws in order to cause a flat paddle to engage the side wall surface of the interfloor passage. Another method involves the use of a plurality of gripping fingers to provide self-anchoring, as disclosed, for example, in U.S. Pat. No. 4,770,643 to Castellani et al. Such fingers are angled so as to bend on insertion, but to resist subsequent pull-out of the poke-through. The devices with gripping fingers have the disadvantage of requiring a high insertion force in configurations that meet minimum pull-out force requirements. Further, they may take a permanent set (i.e., plastically deform) in use and thus not be reusable. The devices requiring the installer to run fastening screws are undesirably labor-intensive. Further, prior art devices which require wrapping with a sheet of intumescent material are labor-intensive to manufacture.

There is, therefore, a need in the prior art for a poke-through electrical connection assembly which provides a self-anchoring retainer which meets minimum pull-out force requirements and yet has a low insertion force. The assembly and retainer should be re-usable, and the retainer should preferably be removable from the remainder of the assembly. Further, the intumescent material should be easy to apply during the manufacturing process.

SUMMARY OF THE INVENTION

It is an object of the present invention to provide a poke-through assembly for permitting passage of electrical wire and cables between floors.

It is a further object of the present invention to provide a poke-through assembly which may be easily and securely mounted in a through hole in a floor.

In the efficient attainment of these and other objects, the present invention provides a poke-through electrical connection assembly for insertion in an interfloor passage. The passage has a longitudinal axis and a passage wall defining a generally circular cross-section with a passage diameter. The assembly includes an elongate, generally tubular housing member sized and shaped for insertion into the interfloor passage. The assembly also includes at least a first retaining clip secured to a first exterior portion of the elongate housing member. The clip includes a generally transverse flexure portion which forms a partial chord to the generally circular cross-section of the passage. The flexure portion has at least a first edge.

At least a first anchor point emanates from the first edge of the transverse flexure portion. The anchor point is dimensioned and angled from the flexure portion for substantially radially-directed engagement with the passage wall of the interfloor passage. Thus, when inserted into the interfloor passage, the anchor point is displaced and loaded substantially compressively, causing a bending moment to be developed in the transverse flexure portion. The bending moment in turn results in flexure of the flexure portion, with concomitant application of a reactive retaining force by the anchor point.

In a preferred embodiment, the generally transverse flexure portion is generally planar and is disposed parallel to the longitudinal axis of the interfloor passage. The flexure portion has two edges, each of which has an anchor point emanating from it. A second retaining clip is provided on a second interior portion of the tubular housing opposite the first clip. On both clips, the anchor points each form angles of about 120° with the flexure portions. Diametrically opposed anchor points each lie on a common line passing through the longitudinal axis of the passage. The retaining clips are designed so that the yield point of the material from which they are constructed will not be exceeded in normal usage. Intumescent material is provided in the form of an easily-assembled, substantially unitary sleeve.

As a result, the present invention provides a poke-through electrical connection assembly with a self-anchoring retainer which meets minimum pullout force requirements, yet does not require excessive insertion forces. The present invention also provides a reusable, removable retainer. The present invention further provides a poke-through assembly wherein the intumescent material is provided in the form of an easily-assembled sleeve.

DETAILED DESCRIPTION OF THE INVENTION

Figure 1A:
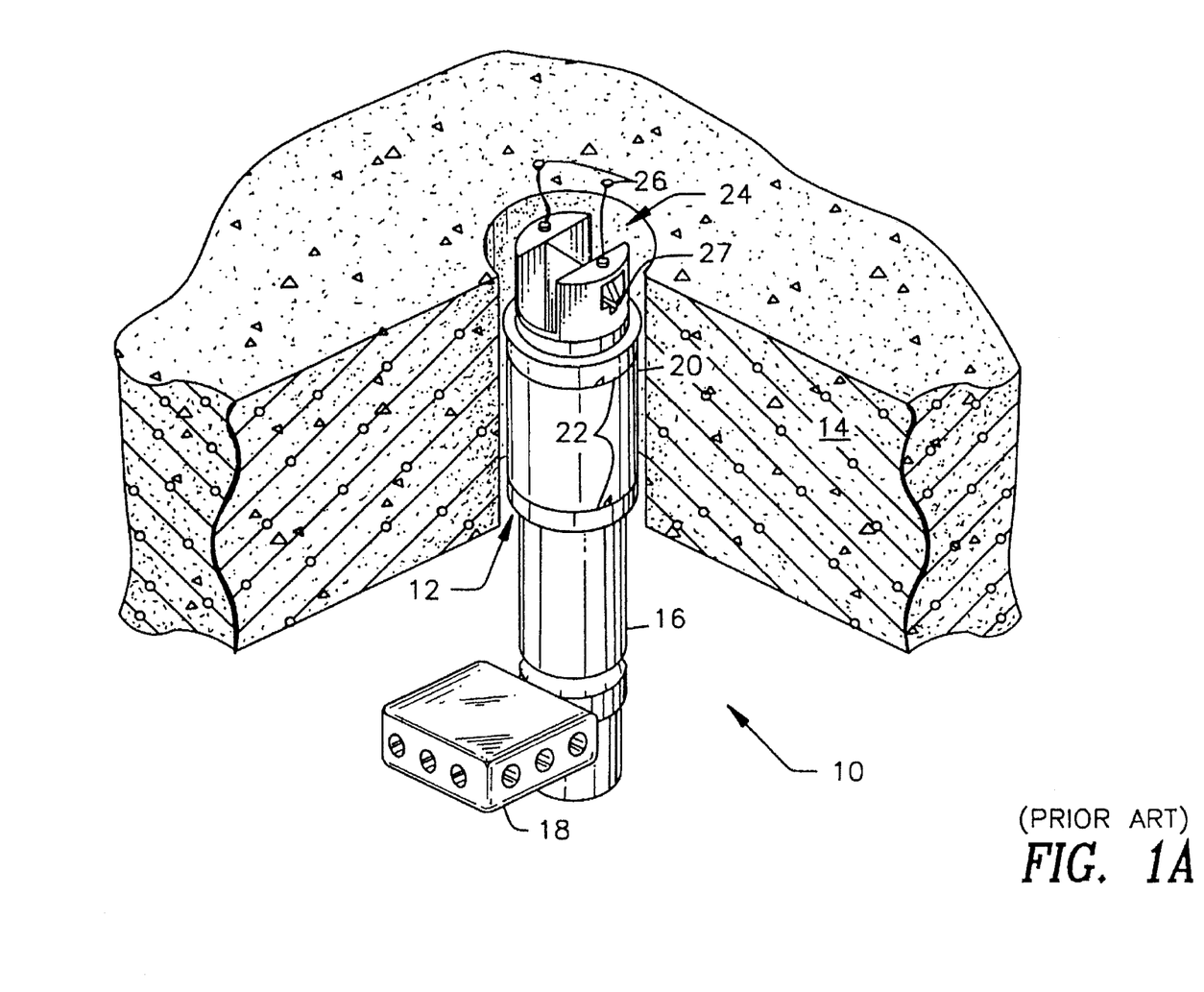
FIG. 1A is a partial cut-away perspective view of a prior art poke-through device installed in an interfloor passage in a concrete floor.
Figure 1B:
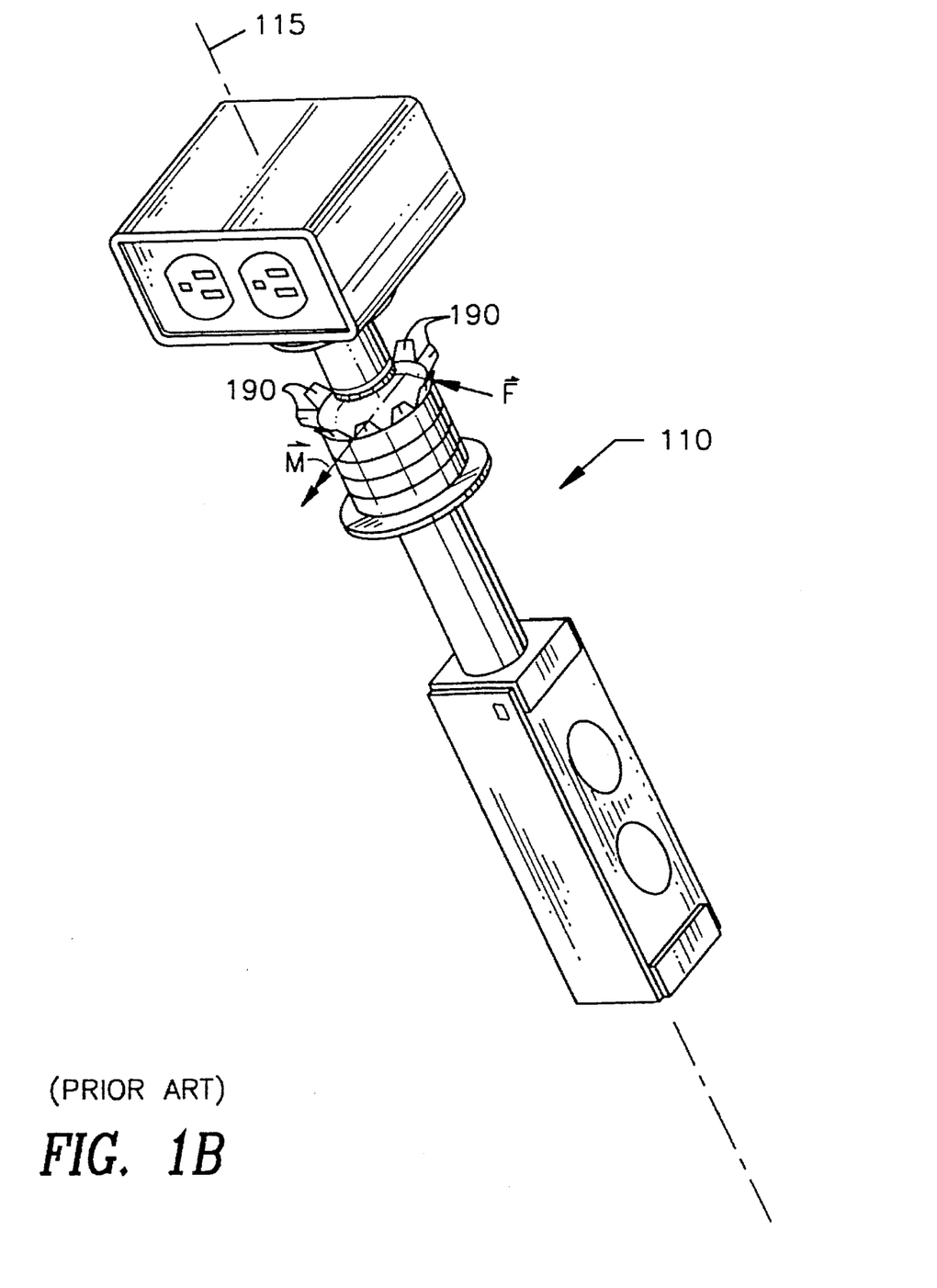
FIG. 1B is a perspective view of a prior art device showing the functioning of a prior art retaining clip.

For a full appreciation of the functioning of the present invention, reference is first made to prior art FIGS. 1A and 1B. In FIG. 1A, poke-through assembly 10 is shown inserted in interfloor passage 12 of concrete floor 14. Assembly 10 includes elongate, generally tubular housing member 16 sized and shaped for insertion into passage 12. An underfloor junction box 18 is secured to the lower end of housing member 16. A sheet of intumescent material 20 is secured about housing member 16 with wires 22. The upper end 24 of housing 16 is provided with two mounting screws 26 for securing a face plate or other device. Devices such as that depicted in FIG. 1A are described in co-assigned U.S. Pat. No. 5,003,127 to Sosinski et al. and in co-assigned U.S. Pat. No. 5,107,072 to Morgan, the disclosures of both of which are incorporated herein by reference. A side channel 27 may be provided, as disclosed in the '127 and '072 patents, for securing a retaining nut.

Referring now to FIG. 1B, another type of prior-art poke-through assembly 110 is shown. Assembly 110 includes fingers 190 for anchoring assembly 110 to the wall of an interfloor passage (not shown for reasons of clarity). Longitudinal axis 115 of the interfloor passage is shown for reference purposes. Each finger 190 is subject to a force F which produces a bending moment M in the finger. It can be seen that the vector representing each bending moment M will lie in a plane perpendicular to longitudinal axis 115. A device such as that depicted in FIG. 1B is described in U.S. Pat. No. 4,323,724 to Shine.

Figure 2:
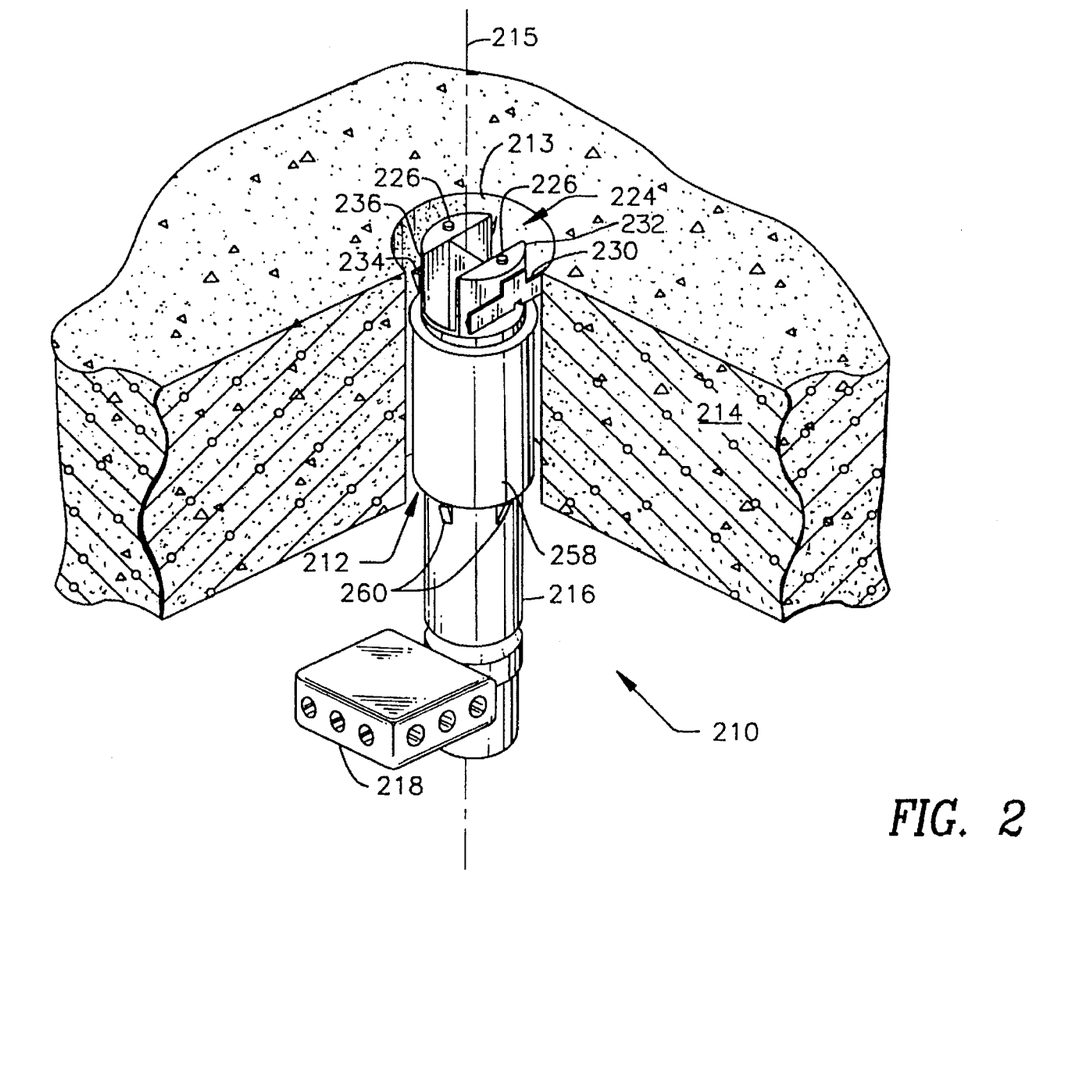
FIG. 2 is a partial cut-away perspective view of a poke-through device according to the present invention installed in an interfloor passage in a concrete floor.

Bearing the characteristics of the prior art devices in mind, reference is now made to FIG. 2, which shows a poke-through assembly 210 in accordance with the present invention, and wherein components similar to those in FIG. 1A have received the same reference number incremented by 200. Poke-through electrical connection assembly 210 is inserted into interfloor passage 212 formed in floor 214. Passage 212 has a generally circular cross-section with a passage diameter defined by passage wall 213. Passage 212 also has a longitudinal axis 215.

Poke-through assembly 210 includes elongate, generally tubular housing member 216 sized and shaped for insertion into passage 212. At least a first retaining clip 230 is secured to a first exterior portion 232 of housing member 216. Preferably, a second retaining clip 234 is secured to a second exterior portion 236 of housing member 216.

Figure 3A:
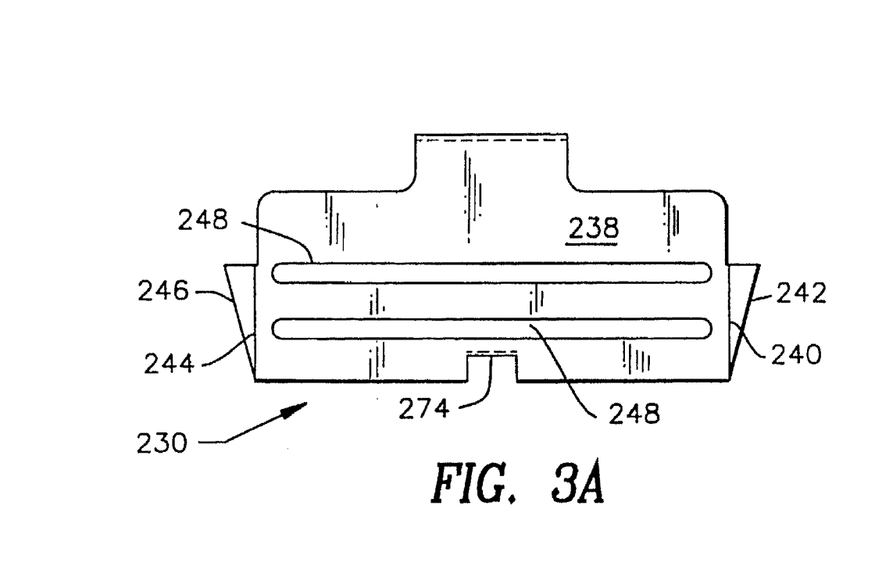
FIG. 3A is a front elevation of a retaining clip used on the poke-through device of FIG. 2.
Figure 3B:
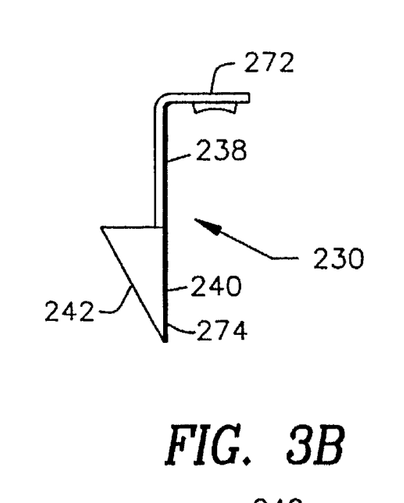
FIG. 3B is a side elevational view of the clip of FIG. 3A.
Figure 3C:
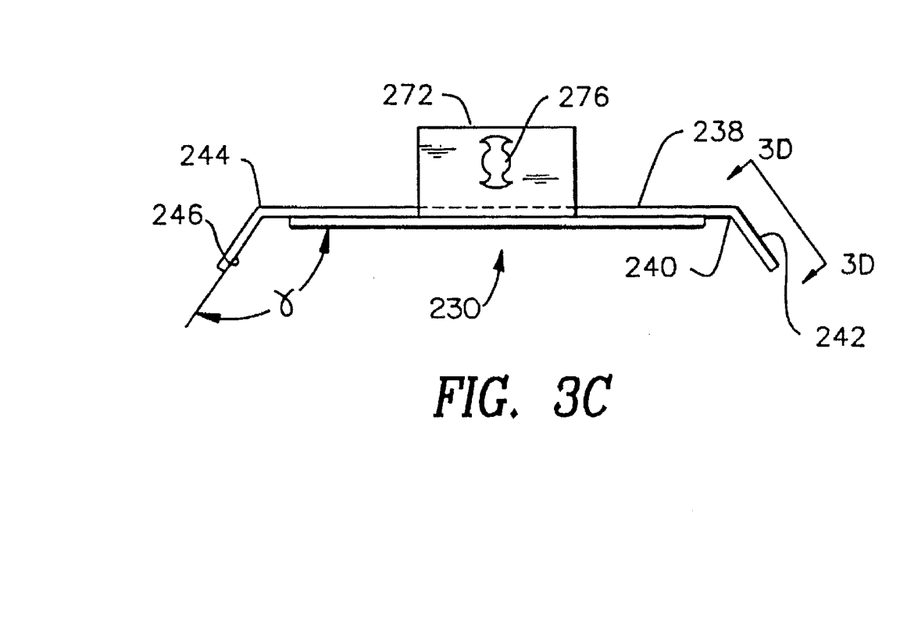
FIG. 3C is a top plan view of the clip of FIG. 3A.

Referring now to FIGS. 3A–3D, first clip 230 includes a generally transverse flexure portion 238, which is preferably generally planar and is preferably disposed parallel to longitudinal axis 215 of passage 212 (as seen in FIG. 2). As best seen in FIG. 4, which is a view looking down along longitudinal axis 215 of passage 212, flexure portion 238 forms a partial chord to the generally circular cross-section of passage 212. Referring back to FIGS. 3A–3D, flexure portion 238 also has at least a first edge 240, which is preferably parallel to longitudinal axis 215 of passage 212. At least a first anchor point 242 emanates from first edge 240. As best seen in FIG. 4, first anchor point 242 is dimensioned and angled from flexure portion 238 for substantially radially-directed engagement with wall 213 of passage 212. Thus, upon engagement with wall 213, anchor point 242 is displaced inwardly and is loaded substantially compressively. The compressive load in anchor point 242 results in development of a compressive load and a shear load, with a concomitant bending moment, in transverse flexure portion 238. In turn, a reactive retaining force is applied to wall 213 of passage 212 by first anchor point 242.

Preferably, flexure portion 238 also includes a second edge 244 (best seen in FIG. 3A), generally opposite first edge 240 and preferably parallel to longitudinal axis 215 of interfloor passage 212. A second anchor point 246 preferably emanates from second edge 244. The second anchor point 246 is also dimensioned and angled from flexure portion 238 for substantially radially-directed engagement with wall 213 of passage 212, as best seen in FIG. 4.

Referring still to FIGS. 3A–3D, first clip 230 preferably includes a strengthening rib 248, and most preferably includes two such ribs. It will be appreciated that ribs 248 increase the flexural rigidity of flexure portion 238 so that it produces a greater retaining force for a given displacement. Clip 230 is preferably formed from a preselected elastic material such as type 302 spring temper stainless steel. Flexure portion 238 preferably has a preselected thickness, for example, 0.015 inches, and ribs 248 preferably have a preselected depth, for example, 0.030 inches. The clip material, flexure portion thickness, and rib depth are preferably selected so as to limit stresses developed in the clip in normal usage to values below the yield point of the elastic material, thereby enabling clip 230 to be reused.

Figure 3D:
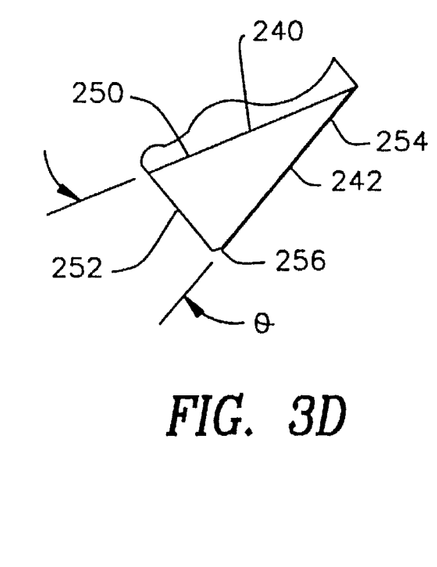
FIG. 3D is an auxiliary view of an anchor point, taken along line 3D—3D of FIG. 3C.
Figure 4:
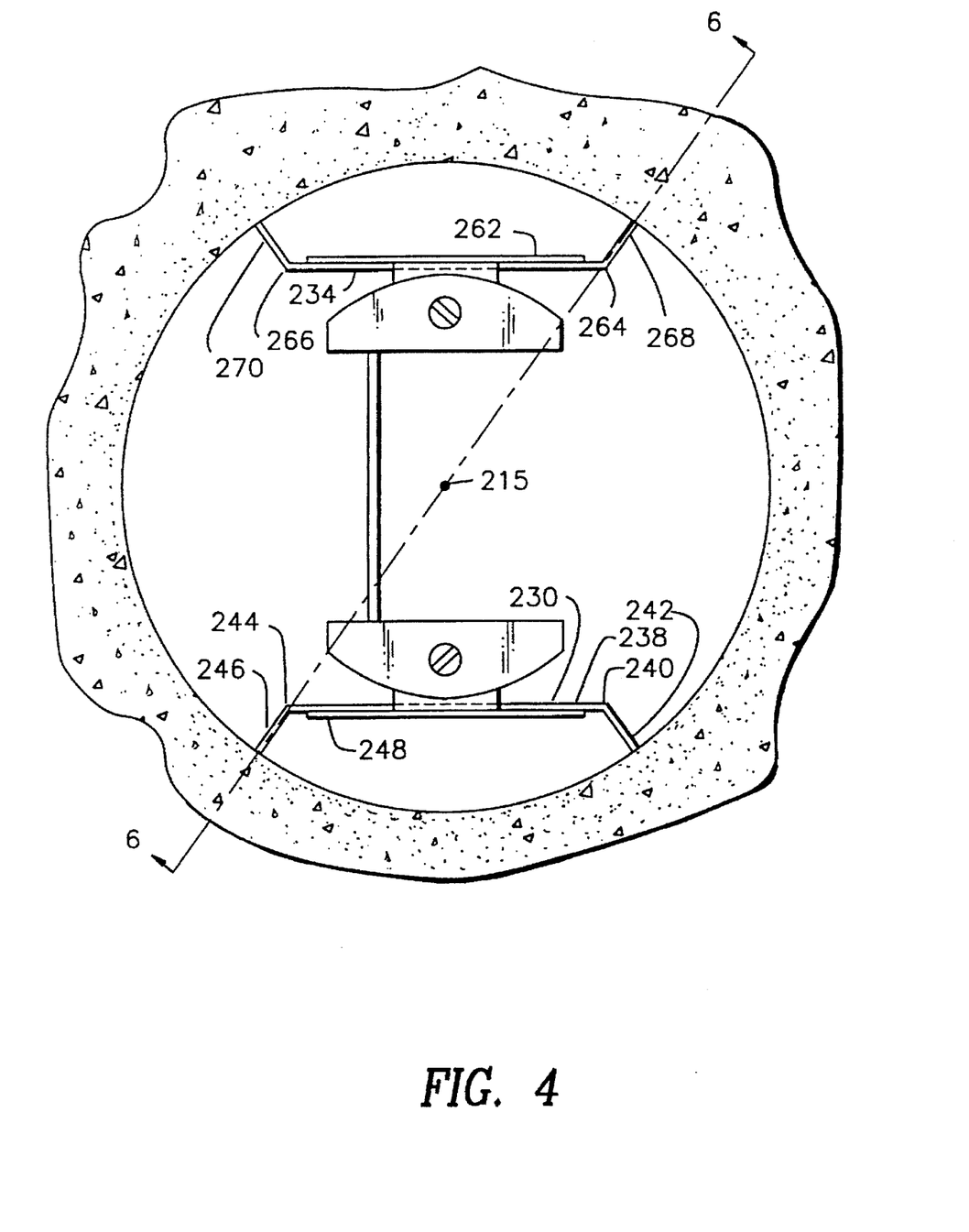
FIG. 4 is a top plan view of the poke-through device of FIG. 2.

Referring particularly to FIG. 3D, first anchor point 242 is preferably formed so as to be generally in the shape of a right triangle having a base 250, shorter side 252, and hypotenuse 254. Base 250 is preferably coincident with at least a portion of first edge 240 of flexure portion 238. Hypotenuse 254 is preferably angled from base 250 so as to form a taper for easy insertion of the anchor point 242 into the interfloor passage 212. Preferably, hypotenuse 254 is angled from base 250 at an angle θ of about 28°. Shorter side 252 and hypotenuse 254 preferably intersect in a corner region which is broken to provide a relatively short bearing edge 256 substantially parallel to base 250.

Referring again to FIG. 2, poke-through assembly 210 preferably includes a substantially unitary sleeve 258 of intumescent material which surrounds elongate housing member 216, preferably below first exterior portion 232 where first clip 230 is secured. Sleeve 258 is preferably retained by at least one (and preferably a plurality of) intumescent sleeve retaining member(s) 260, which preferably emanate(s) from the elongate housing member 216 below sleeve 258.

As noted, poke-through assembly 210 preferably includes second retaining clip 234 secured to second exterior portion 236 of housing member 216, preferably opposite first retaining clip 230. Second clip 234 is preferably substantially identical to first clip 230, including a generally transverse, generally planar main flexure portion 262 (best seen in FIG. 4) disposed parallel to flexure portion 238 of first clip 230. Flexure portion 262 preferably has first and second opposed edges 264 and 266, each of which is substantially parallel to longitudinal axis 215 of passage 212. Third and fourth anchor points 268, 270 preferably emanate respectively from first and second edges 264, 266, and are preferably dimensioned and angled from flexure portion 262 for substantially radially-directed engagement with passage wall 213 of interfloor passage 212.

Referring back to FIG. 3C, second anchor point 246 forms an angle γ with flexure portion 238 of first retaining clip 230. First anchor point 242 preferably forms an equal angle with flexure portion 238, while third and fourth anchor points 268, 270 preferably form equal angles with flexure portion 262 of second clip 234. Preferably; angle γ is 120°.

Referring now to FIG. 4, it will be seen that second anchor point 246 and third anchor point 268 preferably lie on a common line (cutting plane line 6—6) which intersects the longitudinal axis 215 of passage 212. Similarly, first anchor point 242 and fourth anchor point 270 also preferably lie on a common line (not shown) which intersects the longitudinal axis 215 of passage 212. This configuration has been found to provide balanced retaining forces which meet minimum pull-out force requirements without excessive insertion force.

Figure 6:
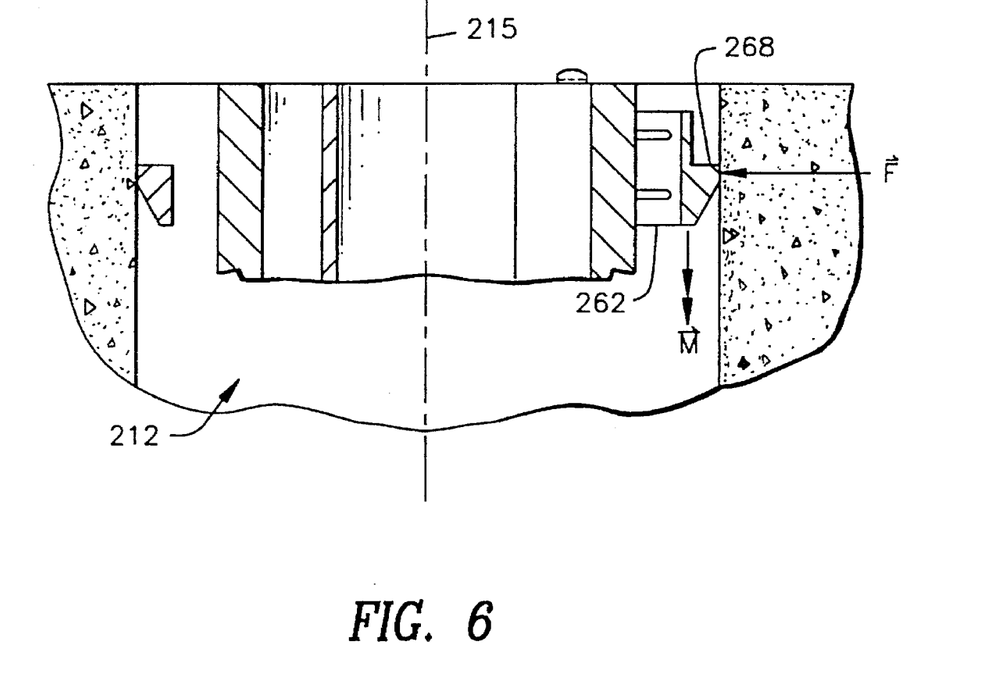
FIG. 6 is a partial longitudinal section taken along line 6—6 of FIG. 4.

Referring now to FIG. 6, it will be seen that force F acting on anchor point 268 loads anchor point 268 compressively, which in turn results in a shear and compression load, with concomitant bending moment, in flexure portion 262. Bending moment M, in vector form, is substantially parallel to longitudinal axis 215 of passage 212 (unlike prior art devices). The other anchor points 242, 246, 270 are similarly loaded. Loading in this fashion contributes to achieving the aforementioned balanced retaining forces, and permits flexure over a greater length than prior art devices. This is because the length available for flexure is limited by the chord length rather than to a fraction of the radius of the passage, as in the prior art.

Referring to FIGS. 3A–3C, clip 230 is preferably formed with upper mounting bracket 272. Bracket 272 preferably is provided with a hole 276. Hole 276 may receive mounting screw 226, for purposes of securing clip 230 to first exterior portion 232 of housing member 216. A lower mounting tab 274, as shown in FIGS. 3A–3C, may be provided for cooperative engagement with a lower portion of a side channel of a poke-through assembly such as side channel 27 of prior art assembly 10 shown in FIG. 1. Bracket 272 may also be received in channel 27, at an upper portion of the channel.

Figure 5:
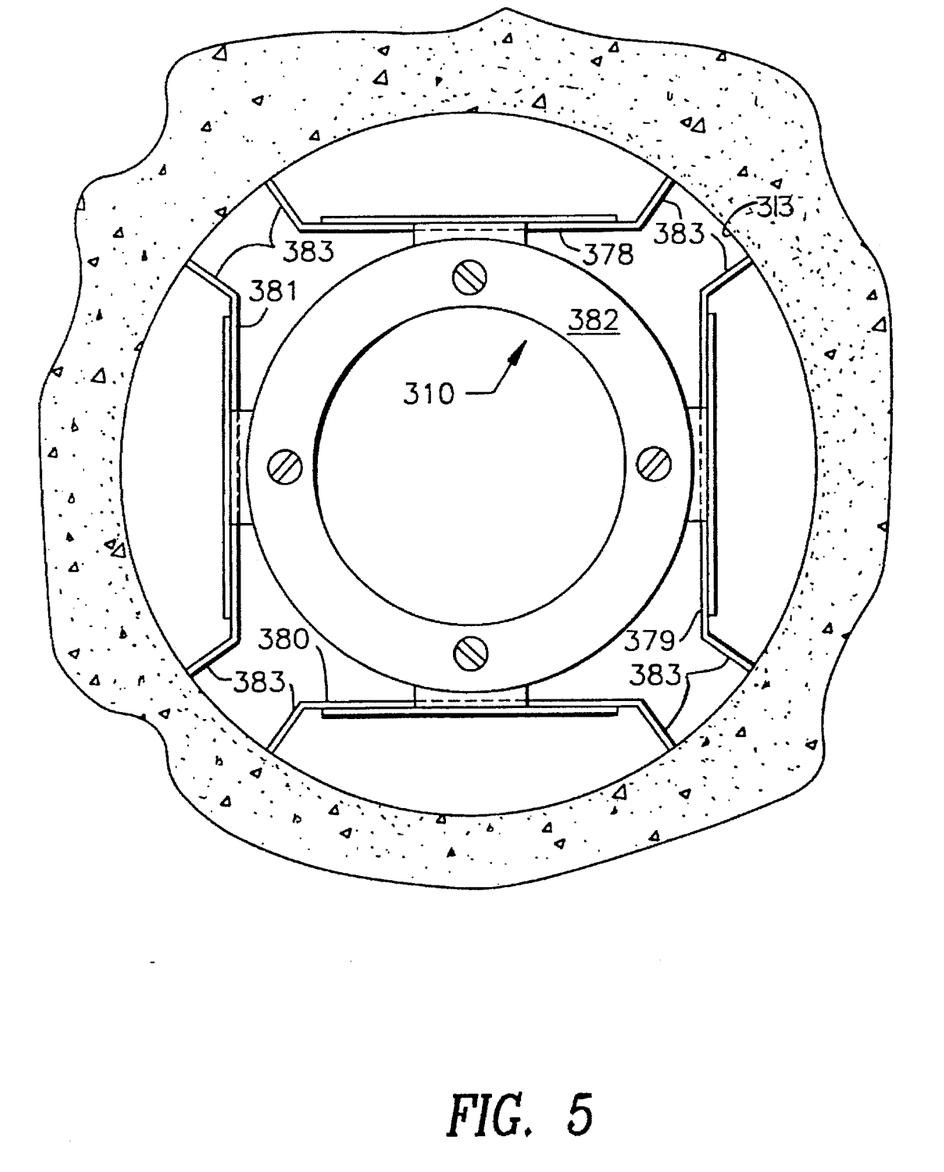
FIG. 5 is a view similar to FIG. 4 but showing an embodiment of the invention with four retaining clips.

Referring finally to FIG. 5, an alternative embodiment of the present invention is shown which employs four retaining clips 378–381, attached to a cylindrical housing 382 of a poke-through device 310. The four clips 378–381, which engage interfloor passage wall 3 13, are substantially similar to those described above. Use of four clips provides a greater retaining force than use of a lesser number of clips. The anchor points 383 of opposed clips 378, 380 and 379, 381 preferably have the same relationship as described above with reference to FIG. 4 for the two-clip embodiment.

While there have been described what are presently believed to be the preferred embodiments of the invention, those skilled in the art will realize that various changes and modifications may be made to the invention without departing from the invention, and it is intended to claim all such changes and modifications as fall within the scope of the invention.

What is claimed is:

1. A poke-through electrical connection assembly for insertion in an interfloor passage, said interfloor passage having a longitudinal axis and a passage wall defining a generally circular cross section with a passage diameter, said assembly comprising:

an elongate, generally tubular housing member sized and shaped for insertion into said interfloor passage; and a first retaining clip secured to a first exterior portion of said elongate housing member, said first retaining clip including a generally transverse flexure portion, said transverse flexure portion forming a partial chord to said generally circular cross section of said passage, said transverse flexure portion having at least a first edge, said retaining clip further including a first anchor point emanating from said first edge of said flexure portion, said anchor point being dimensioned and angled from said flexure portion for substantially radially-directed engagement with said passage wall of said interfloor passage, whereby said anchor point is displaced and loaded substantially compressively and causes a bending moment to be developed in said transverse flexure portion for application of a reactive retaining force by said anchor point.

2. A poke-through electrical connection assembly for insertion in an interfloor passage, said interfloor passage having a longitudinal axis and a passage wall defining a generally circular cross section with a passage diameter, said assembly comprising:

an elongate, generally tubular housing member sized and shaped for insertion into said interfloor passage; and a first retaining clip secured to a first exterior portion of said elongate housing member, said first retaining clip including a generally transverse, generally planar main flexure portion disposed parallel to said longitudinal axis of said passage, said flexure portion forming a partial chord to said generally circular cross section of said passage, said flexure portion having at least a first edge substantially parallel to said longitudinal axis of said passage, said retaining clip further including a first anchor point emanating from said substantially parallel first edge of said flexure portion, said anchor point being dimensioned and angled from said flexure portion for substantially radially-directed engagement with said passage wall of said interfloor passage, whereby said anchor point is displaced and loaded substantially compressively and causes a bending moment to be developed in said transverse flexure portion for application of a reactive retaining force by said anchor point.

3. The poke-through assembly of claim 2, wherein said flexure portion has at least a second edge substantially parallel to said longitudinal axis of said passage and generally opposite said first edge, further comprising a second anchor point emanating from said second edge of said flexure portion, said second anchor point being dimensioned and angled from said flexure portion for substantially radially-directed engagement with said passage wall of said interfloor passage, whereby said second anchor point is displaced and loaded substantially compressively and cooperates with said first anchor point for application of said reactive retaining force by said anchor points.

4. The poke-through assembly of claim 3, further comprising a second retaining clip secured to a second exterior portion of said elongate housing member opposite said first retaining clip, said second retaining clip including a generally transverse, generally planar main flexure portion disposed parallel to said flexure portion of said first retaining clip, said flexure portion of said second clip having first and second opposed edges each substantially parallel to said longitudinal axis of said passage, said second retaining clip further including third and fourth anchor points emanating from said first and second opposed edges of said flexure portion of said second clip, said third and fourth anchor points being dimensioned and angled from said flexure portion of said second clip for substantially radially-directed engagement with said passage wall of said interfloor passage.

5. The poke-through assembly of claim 4, wherein:

said first and second anchor points each form an angle of approximately 120 degrees with said flexure portion of said first retaining clip;

said third and fourth anchor points each form an angle of approximately 120 degrees with said flexure portion of said second retaining clip;

said first and fourth anchor points lie on a common line intersecting said longitudinal axis of said passage; and said second and third anchor points lie on another common line intersecting said longitudinal axis of said passage.

6. The poke-through assembly of claim 2, wherein said generally planar main flexure portion of said retaining clip includes at least one strengthening rib for increasing its flexural rigidity.

7. The poke-through assembly of claim 6, wherein:

said flexure portion of said retaining clip has a preselected thickness;

said strengthening rib has a depth;

said clip is formed from a preselected elastic material having a yield point; and said preselected material of said clip, said depth of said rib, and said thickness of said flexure portion are selected to limit stresses developed in said clip in normal usage to values below said yield point of said elastic material.

8. The poke-through assembly of claim 2, wherein said first anchor point is generally in the shape of a right triangle having a base, shorter side, and hypotenuse, said base of said first anchor point being coincident with at least a portion of said first edge of said flexure portion, said hypotenuse being angles from said base so as to form a taper for easing insertion of said anchor point into said interfloor passage.

9. The poke-through assembly of claim 8, wherein:

said hypotenuse is angled from said base at an angle of approximately 28 degrees; and said shorter side and said hypotenuse intersect at a corner region which is broken to provide a relatively short bearing edge substantially parallel to said base.

10. The poke-through assembly of claim 2, further comprising:

a substantially unitary sleeve of intumescent material surrounding said elongate housing member below said first exterior portion where said retaining clip is secured; and at least one intumescent sleeve retaining member emanating from said elongate housing member below said sleeve of intumescent material.

* * * * *